US012749929B2

(12) United States Patent

AbuKhalaf et al.

(10) Patent No.: US 12,749,929 B2
(45) Date of Patent: Sep. 29, 2026

(54) COMMUNICATIONS OPERATIONS IN WIRELESS POWER SYSTEMS

(71) Applicant: Apple Inc., Cupertino, CA (US)

(72) Inventors: Zaid A AbuKhalaf, Sunnyvale, CA (US); Herve Grabas, Mountain View, CA (US); Alin I Gherghescu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 18/937,480

(22) Filed: Nov. 5, 2024

(65) Prior Publication Data

US 2025/0309699 A1 Oct. 2, 2025

Related U.S. Application Data

(60) Provisional application No. 63/572,073, filed on Mar. 29, 2024.

(51) Int. Cl.
*H02J 50/80* (2016.01)
*H02J 50/10* (2016.01)
*H04L 27/06* (2006.01)

(52) U.S. Cl.
CPC .............. *H02J 50/80* (2016.02); *H02J 50/10* (2016.02); *H04L 27/06* (2013.01)

(58) Field of Classification Search
CPC ............ H02J 50/80; H02J 50/10; H04L 27/06
USPC .......................................................... 307/104
See application file for complete search history.

(56) References Cited

U.S. PATENT DOCUMENTS

| | | | | |
|---|---|---|---|---|
| 8,035,255 | B2 | 10/2011 | Kurs et al. | |
| 8,129,864 | B2 | 3/2012 | Baarman et al. | |
| 8,482,158 | B2 | 7/2013 | Kurs et al. | |
| 9,425,642 | B2 | 8/2016 | Toncich et al. | |
| 9,685,814 | B1 | 6/2017 | Moyer et al. | |
| 10,714,976 | B2 | 7/2020 | Uchimoto | |
| 2011/0298421 | A1 | 12/2011 | Palay et al. | |
| 2014/0080414 | A1 | 3/2014 | Gopalan et al. | |
| 2014/0247152 | A1 | 9/2014 | Proud | |
| 2014/0266019 | A1 | 9/2014 | Pigott | |
| 2017/0093222 | A1 | 3/2017 | Joye et al. | |
| 2017/0208597 | A1* | 7/2017 | Gollakota | H04W 24/08 |
| 2018/0131411 | A1 | 5/2018 | Floresca et al. | |
| 2018/0152041 | A1 | 5/2018 | Onishi | |
| 2019/0312459 | A1 | 10/2019 | Garbus et al. | |

(Continued)

FOREIGN PATENT DOCUMENTS

| | | | |
|---|---|---|---|
| CN | 104123820 | A | 10/2014 |
| CN | 111711250 | A | 9/2020 |

(Continued)

*Primary Examiner* — Alfonso Perez Borroto
(74) *Attorney, Agent, or Firm* — Treyz Law Group, P.C.; Joseph F. Guihan

(57) ABSTRACT

A wireless power system may include a power transmitting device for transmitting wireless power to a power receiving device that receives the wireless power. The power transmitting device can include data communications facilities for sending and receiving data packets. The power transmitting device can selectively turn off its data communications facilities. The power receiving device can include data communications facilities for sending and receiving data packets. The power receiving device can selectively turn off its data communications facilities.

20 Claims, 6 Drawing Sheets

(56) References Cited

U.S. PATENT DOCUMENTS

| | | | | |
|---|---|---|---|---|
| 2020/0136434 | A1 | 4/2020 | Leeks | |
| 2020/0328621 | A1* | 10/2020 | Zeine | H02J 50/001 |
| 2020/0382167 | A1* | 12/2020 | Park | H04B 5/79 |
| 2020/0403456 | A1 | 12/2020 | Louis et al. | |
| 2023/0006473 | A1* | 1/2023 | Gao | H02J 50/10 |
| 2023/0018665 | A1* | 1/2023 | He | H02J 50/80 |
| 2023/0163806 | A1* | 5/2023 | Peralta | H02J 50/12<br>455/41.1 |
| 2023/0179257 | A1* | 6/2023 | Park | H04B 5/79<br>340/12.5 |
| 2023/0254886 | A1* | 8/2023 | Gupta | H02J 13/12<br>370/329 |
| 2024/0048002 | A1 | 2/2024 | Lebens et al. | |

FOREIGN PATENT DOCUMENTS

| | | | |
|---|---|---|---|
| CN | 111740504 | B | 5/2022 |
| KR | 20150031852 | A | 3/2015 |
| KR | 102036636 | B1 | 10/2019 |
| KR | 102048989 | B1 | 11/2019 |
| KR | 102058367 | B1 | 12/2019 |
| KR | 102561180 | B1 | 7/2023 |

* cited by examiner

500

| PCE SELECTOR | SILENT PERIOD DURATION |
|---|---|
| 0 | T1 |
| 1 | T2 |
| 2 | T3 |
| 3 | T4 |

⋮

COMMUNICATIONS OPERATIONS IN WIRELESS POWER SYSTEMS

This application claims the benefit of U.S. Provisional Patent Application No. 63/572,073, filed Mar. 29, 2024, which is hereby incorporated by reference herein in its entirety.

FIELD

This relates generally to power systems and, more particularly, to wireless power systems for charging electronic devices.

BACKGROUND

In a wireless charging system, a wireless power transmitting device transmits wireless power to a wireless power receiving device. The wireless power receiving device charges a battery and/or powers components using the wireless power. The wireless power receiving device may communicate with the wireless power transmitting device to control wireless power transfer operations.

SUMMARY

An aspect of the disclosure provides a method of operating an electronic device. The method can include: transmitting, with a wireless power transfer coil, wireless power to a power receiving device; obtaining, with a data receiver coupled to the wireless power transfer coil, a packet transmitted from the power receiving device; determining whether the packet has an associated silent period; and deactivating one or more communications components of the electronic device during at least a portion the silent period in response to determining that the packet has an associated silent period.

An aspect of the disclosure provides a power transmitting device that includes a wireless power transfer coil, an inverter configured to supply alternating-current signals to the wireless power transfer coil for transmitting wireless power to a power receiving device, a data receiver coupled to the wireless power transfer coil and configured to obtain a packet, transmitted from the power receiving device, having an associated communications silence period, and control circuitry configured to deactivate at least part of the data receiver during at least a portion of the communications silence period.

An aspect of the disclosure provides a power receiving device that includes a battery, a wireless power transfer coil configured to receive wireless power from a power transmitting device, a rectifier coupled to the wireless power transfer coil and configured to output a voltage for charging the battery, a data transmitter coupled to the wireless power transfer coil and configured to transmit a packet to the power transmitting device, the packet having an associated communications silence period, and control circuitry configured to deactivate at least part of the data transmitter during at least a portion of the communications silence period.

An aspect of the disclosure provides a non-transitory computer-readable storage medium storing one or more programs configured to be executed by one or more processors of a power transmitting device configured to transmit wireless power to a power receiving device, the power transmitting device having a wireless power transfer coil and a data receiver coupled to the wireless power transfer coil. The one or more programs can include instructions for processing a packet at the data receiver, determining whether the packet has an associated silent period, and for deactivating at least part of the data receiver during at least a portion of the silent period in response to determining that the packet has an associated silent period.

An aspect of the disclosure provides a non-transitory computer-readable storage medium storing one or more programs configured to be executed by one or more processors of a power receiving device configured to receive wireless power from a power transmitting device, the power receiving device having a wireless power transfer coil and a data transmitter coupled to the wireless power transfer coil. The one or more programs can include instructions for transmitting a packet with the data transmitter, the packet having an associated silent period, and for deactivating the data transmitter during at least a portion of the silent period after transmitting the packet.

An aspect of the disclosure provides control circuitry coupled to a wireless power transfer coil of a power transmitting device. The control circuitry can be configured to initiate communications with a power receiving device during which the wireless power transfer coil transmits wireless power to a power receiving device, to process a packet received from the power receiving device during the communications, to determine whether the packet has an associated silent period, and to deactivate one or more communications component of power transmitting device during at least a portion of the silent period in response to determining that the packet has an associated silent period.

An aspect of the disclosure provides control circuitry coupled to a wireless power transfer coil of a power receiving device. The control circuitry can be configured to initiate communications with a power transmitting device during which the wireless power transfer coil receives wireless power from the power transmitting device, to transmit a packet to the power transmitting device during the communications, and to deactivate one or more communications component of the power receiving device during at least a portion of a silent period associated with the packet.

DETAILED DESCRIPTION

A wireless power transfer system includes a wireless power transmitting device and a wireless power receiving device. The wireless power transmitting device (sometimes referred to herein as "PTX") can transmit wireless power to the wireless power receiving device (sometimes referred to herein as "PRX"). Wireless power receiving devices may include electronic devices such as wristwatches, cellular telephones, tablet computers, laptop computers, ear buds, battery cases for ear buds and other devices, tablet computer styluses (pencils) and other input-output devices, wearable devices, head-mounted devices, glasses, or other electronic equipment. The wireless power transmitting device may be an electronic device such as a wireless charging mat or puck, a tablet computer or other battery-powered electronic device with wireless power transmitting circuitry, or other wireless power transmitting device. The wireless power receiving devices use the wireless power received from the wireless power transmitting device for powering internal components and for charging an internal battery. Because transmitted wireless power is often used for charging internal batteries, wireless power transmission operations are sometimes referred to as wireless power transfer or wireless charging operations.

Figure 1:
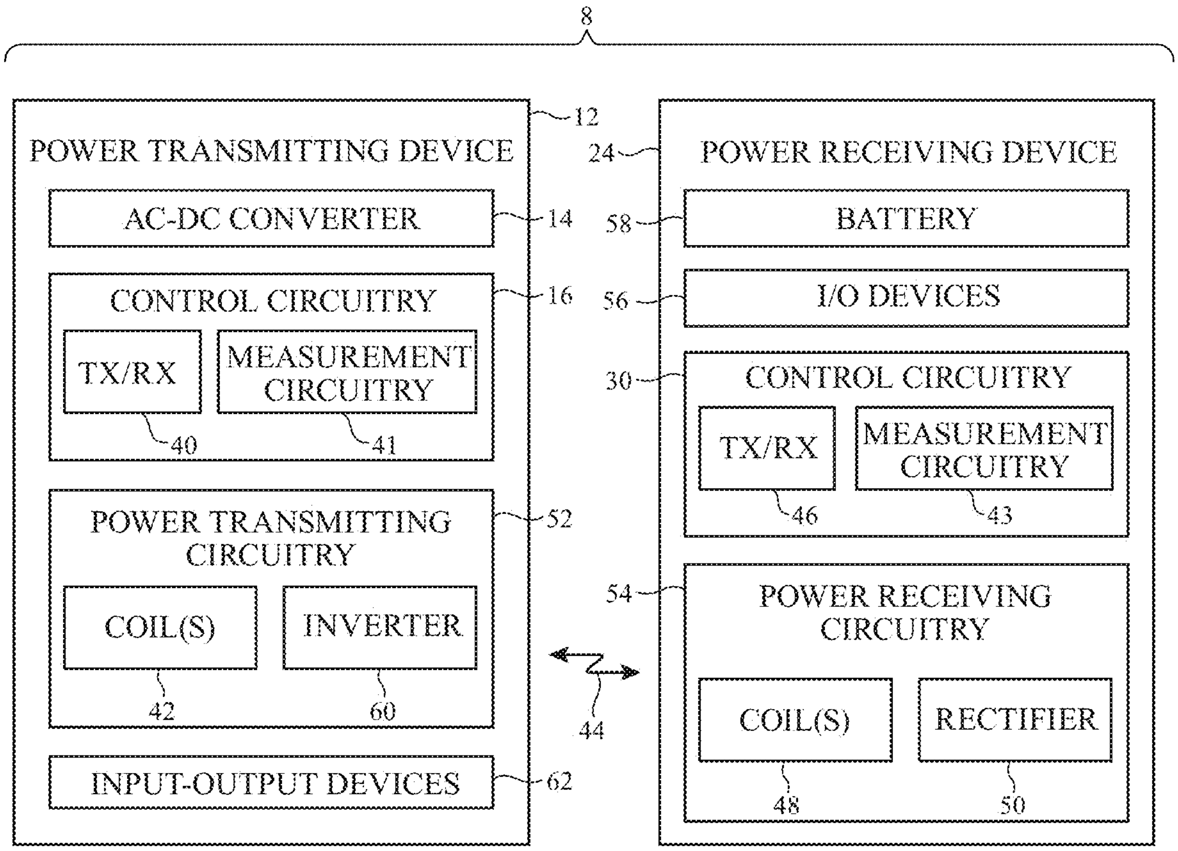
FIG. 1 is a schematic diagram of an illustrative wireless power system in accordance with some embodiments.

An illustrative wireless power transfer system 8, sometimes referred to as a wireless charging system, is shown in FIG. 1. As shown in FIG. 1, system 8 includes a wireless power transmitting device such as wireless power transmitting device 12 and includes a wireless power receiving device such as wireless power receiving device 24. Wireless power transmitting device 12 can include control circuitry 16, whereas wireless power receiving device 24 can include control circuitry 30. Control circuitry in system 8 such as control circuitry 16 and control circuitry 30 is used in controlling the operation of system 8. Such control circuitry may include processing circuitry associated with microprocessors, power management units, baseband processors, application processors, digital signal processors, microcontrollers, and/or application-specific integrated circuits with processing circuits.

The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8. As another example, the processing circuitry may include one or more processors such as an application processor that is used to run software such as internet browsing applications, voice-over-internet-protocol (VOIP) telephone call applications, email applications, media playback applications, operating system functions, power management functions for controlling when one or more processors wake up, game applications, maps, instant messaging applications, payment applications, calendar applications, notification/reminder applications, etc.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors such as an application processor, a central processing unit (CPU) or other processing circuitry.

Wireless power transmitting device 12 may be a stand-alone power adapter (e.g., a wireless charging mat or puck that includes power adapter circuitry), may be a wireless charging mat or puck that is coupled to a power adapter or other equipment by a cable, may be a battery-powered electronic device (cellular telephone, tablet computer, laptop computer, removable case, etc.), may be equipment that has been incorporated into furniture, a vehicle, or other system, or may be other wireless power transfer equipment. Illustrative configurations in which wireless power transmitting device 12 is a wireless charging puck or battery-powered electronic device are sometimes described herein as an example.

Wireless power receiving device 24 may be a portable electronic device such as a wristwatch, a cellular telephone, a laptop computer, a tablet computer, an accessory such as an earbud, a tablet computer input device such as a wireless tablet computer stylus (pencil), a battery case, a wearable device, a head-mounted device, glasses, or other electronic equipment. Wireless power transmitting device 12 may be coupled to a wall outlet (e.g., an alternating current power source), may have a battery for supplying power, and/or may have another source of power. Device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging puck enclosure or battery-powered electronic device enclosure) and a cable may be used to couple DC power from the power converter to device 12. DC power may be used to power control circuitry 16.

During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more wireless power transfer coils 42. Coils 42 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, pad, puck, battery-powered device, etc.) may have only a single wireless power transfer coil. In other arrangements, wireless charging device 12 may have multiple coils (e.g., two or more coils, 5-10 coils, at least 10 coils, 10-30 coils, fewer than 35 coils, fewer than 25 coils, or other suitable number of coils).

As the AC currents pass through one or more coils 42, the coils 42 produce corresponding electromagnetic field 44 in response to the AC current signals. Electromagnetic field (sometimes referred to as wireless power or wireless power signals) 44 can then induce a corresponding AC current to flow in one or more nearby receiver coils such as coil 48 in power receiving device 24. Rectifier circuitry such as a rectifier 50, which contains rectifying components such as synchronous rectification metal-oxide-semiconductor transistors arranged in a bridge network, can convert the induced AC current flowing through coil 48 into DC voltage signals for powering one or more loads in power receiving device 24 such powering application processors as well as charging a battery in device 24. This principle of wireless power transfer can be referred to as the transmitting and receiving of wireless power or wireless power signals.

The DC voltages produced by rectifier 50 can be used in powering an energy storage device such as battery 58 and can be used in powering other components in power receiving device 24. For example, device 24 may include input-output devices 56 such as a display, touch sensor, communications circuits, audio components, sensors, components that produce electromagnetic signals that are sensed by a touch sensor in a tablet computer or other device with a touch sensor (e.g., to provide stylus (pencil) input, etc.), and other components, and these components may be powered by the DC voltages produced by rectifier 50 (and/or DC voltages produced by battery 58 or other energy storage device in device 24). Wireless power transmitting device 12 may also include one or more input-output devices 62 (e.g., input devices and/or output devices of the type described in connection with input-output devices 56) or input-output devices 62 may be omitted (e.g., to reduce device complexity).

Control circuitry 16 in power transmitting device 12 can include transceiver circuitry 40 and measurement circuitry 41. Measurement circuitry 41 can be configured to detect external objects on the charging surface of the housing of device 12 (e.g., on the top of a charging pad or, if desired, to detect objects adjacent to the coupling surface of a charging pad). Measurement circuitry 41 is therefore sometimes referred to as external object measurement circuitry. The housing of device 12 may have polymer walls, walls of other dielectric, metal structures, fabric, and/or other housing wall structures that enclose coil(s) 42 and other circuitry of device 12. The charging surface may be a planer outer surface of the upper housing wall of device 12. Measurement circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coil(s) 42 to determine whether any devices 24 are present on the charging surface of device 12.

Control circuitry 30 in power receiving device 24 can include transceiver circuitry 46 and measurement circuitry 43. Measurement circuitry 43 may include signal generator circuitry, pulse generator circuitry, signal detection circuitry, and other and/or measurement circuitry (e.g., circuitry of the type described in connection with circuitry 41 in control circuitry 16). Circuitry 41 and/or circuitry 43 may be used in making current and voltage measurements, measurements of transmitted and received power for power transmission efficiency estimates, coil Q-factor measurements, coil inductance measurements, coupling coefficient measurements, and/or other measurements. Based on this information or other information, control circuitry 30 can characterize the operation of devices 12 and 24. For example, measurement circuitry 41 can measure coil(s) 42 to determine the inductance(s) and Q-factor value(s) for coil(s) 42, can measure transmitted power in device 12 (e.g., by measuring the DC voltage powering inverter 60 and the DC current of inverter 60 and/or by otherwise measuring voltages and currents in the wireless power transmitting circuitry 52 of device 12), and can make other measurements on operating parameters associated with other components in device 12. In power receiving device 24, measurement circuitry 43 can measure coil(s) 48 to determine the inductance(s) and Q-factor value(s) for those coil(s), can measure received power in device 24 (e.g., by measuring the output current and output voltage Vrect of rectifier 50 and/or by otherwise measuring voltages and currents in wireless power receiving circuitry 54 of device 24), and can make other measurements on the operating parameters associated with other components in device 24.

During wireless power transfer operations, wireless transceiver (TX/RX) circuitry 40 can use one or more coils 42 to transmit in-band signals to wireless transceiver circuitry 46 that are received by wireless transceiver circuitry 46 using coil(s) 48. Suitable modulation schemes may support communications between power transmitting device 12 and power receiving device 24. With one illustrative configuration, frequency-shift keying (FSK) can be used to convey in-band data from device 12 to device 24 and amplitude-shift keying (ASK) can be used to convey in-band data from device 24 to device 12. As another example, FSK can be used to convey data in both directions between devices 12 and 24. As another example, ASK can be used to convey data in both directions between devices 12 and 24. Wireless power may be conveyed from device 12 to device 24 during these FSK/ASK transmissions. The transfer of in-band data using FSK/ASK or other modulation schemes between devices 12 and 24 can refer to and be defined herein as "in-band communications." Other types of in-band communications may be used, if desired.

During wireless power transfer operations, power transmitting circuitry 52 supplies AC drive signals to one or more coils 42 at a given power transmission frequency (sometimes referred to as a carrier frequency, power carrier frequency, or drive frequency). The power carrier frequency may be, for example, a predetermined frequency of about 125 kHz, about 128 kHz, about 200 kHz, about 326 kHz, about 360 kHz, at least 80 kHz, at least 100 kHz, less than 500 kHz, less than 300 kHz, 1.78 MHz, 13.56 MHz, or other suitable wireless power frequency. Devices operating under the Qi wireless charging standard established by the Wireless Power Consortium (WPC) generally operate between 110-205 kHz, between 80-300 kHz, or between 300-400 kHz. In some configurations, the power transmission frequency may be negotiated during startup communications between devices 12 and 24. In other configurations, the power transmission frequency can be fixed.

Figure 2:
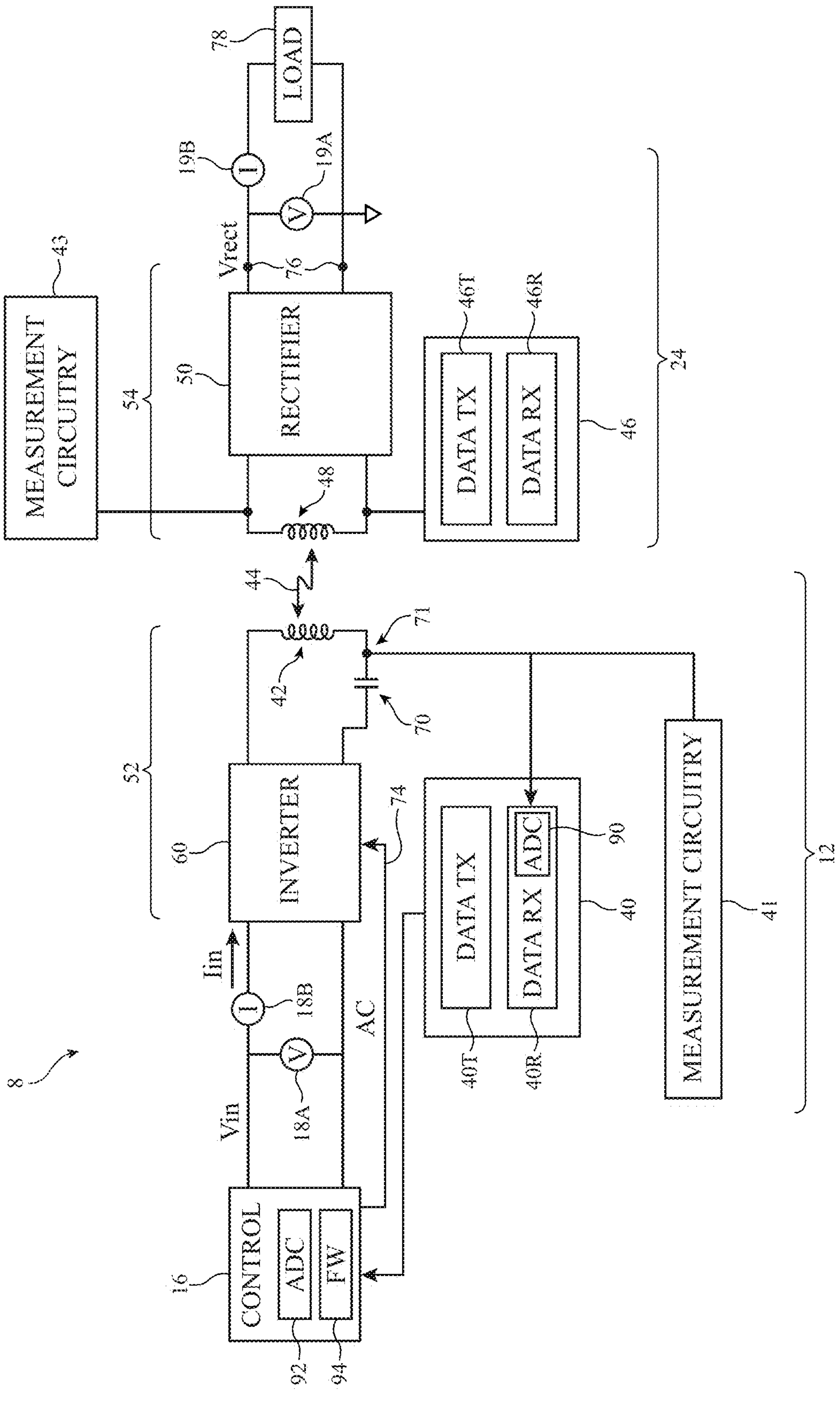
FIG. 2 is a circuit diagram of wireless power transmitting and receiving circuitry in accordance with some embodiments.

FIG. 2 is a diagram showing wireless power transmitting and receiving circuitry and associated wireless data transceiver circuitry in devices 12 and 24. Power transmitting circuitry 52 of device 12 may use inverter 60 or other driver for producing wireless power signals that are transmitted through an output circuit having one or more coil(s) 42 and capacitors such as capacitor 70. Control signals for inverter 60 are provided by control circuitry 16 at control input 74. A single coil 42 is shown in the example of FIG. 2, but multiple coils 42 may be used, if desired.

During wireless power transfer/transmission operations, transistors in inverter 60 are driven by AC control signals from control circuitry 16 (e.g., controller 16 supplies drive signals for inverter 60 at input 74 at a desired AC drive frequency). This causes the output circuit formed from coil 42 and capacitor 70 to produce alternating-current (AC) electromagnetic field (signals 44) that is received by wireless power receiving circuitry 54 formed from coil 48 in device 24. Rectifier 50 can then convert received power from AC to DC and supply a corresponding direct current (DC) output voltage Vrect across rectifier output terminals 76 for powering load 78 in device 24 (e.g., for charging battery 58, for powering a display and/or other input-output devices 56, and/or for powering other circuitry in load 78).

During wireless power transfer operations, while power transmitting circuitry 52 in device 12 is driving AC signals into coil 42 to produce signals 44 at the power transmission frequency, wireless transceiver circuitry 40 in device 12 can use frequency shift keying (FSK) modulation to modulate the power transmission frequency of the driving AC signals and thereby modulate the frequency of signals 44. As shown in FIG. 2, FSK modulator 40T may modulate the power transmission frequency that is being supplied by controller 16 to input 74 of inverter 60. Operated in this way, FSK data is transmitted in-band from device 12 to device 24. This data can be received in power receiving device 24 by using FSK demodulator 46R (data receiver RX) to perform FSK demodulation operations.

In power receiving device 24, coil 48 is used to receive signals 44. Power receiving circuitry 54 in device 24 uses the received signals on coil 48 and rectifier 50 to produce DC power. At the same time, wireless transceiver circuitry 46 (e.g., FSK demodulator 46R) in device 24 uses FSK demodulation to extract the transmitted in-band data from signals 44. This approach allows FSK data (e.g., FSK data packets) to be transmitted in-band from device 12 to device 24 with coils 42 and 48 while wireless power is simultaneously being conveyed from device 12 to device 24 via coils 42 and 48. Transceiver circuitry 46 may be coupled to coil 48 (e.g., via one or more capacitors). Measurement circuitry 43 may also be coupled to coil 48 or some other node in power receiving circuitry 54 to make impedance measurements, impulse response measurements, or other desired measurements for external object detection.

Such in-band communications between device 24 and device 12 can also use ASK modulation and demodulation techniques. For example, wireless transceiver circuitry 46 includes ASK modulator 46T coupled to coil 48 to modulate the impedance of power receiving circuitry 54 (e.g., to adjust the impedance at coil 48). This, in turn, modulates the amplitude of signals 44 and the amplitude of the AC signals passing through coil 42. ASK demodulator 40R monitors the AC signals passing through coil 42 and, using ASK demodulation, extracts the transmitted in-band data from these signals that was transmitted by wireless transceiver circuitry 46. ASK demodulator 40R may be coupled to a node 71 between coil 42 and capacitor 70 or may be coupled to some other node in power transmitting circuitry 52. Similarly, measurement circuitry 41 may optionally be coupled to node 71 or some other node in power transmitting circuitry 52 to make impedance measurements, impulse response measurements, or other desired measurements for external object detection. The use of ASK communications allows ASK data bits (e.g., ASK data packets) to be transmitted in-band from device 24 to device 12 via coils 48 and 42 while wireless power is simultaneously being conveyed from device 12 to device 24 via coils 42 and 48.

Control circuitry 16 can also be configured to provide a supply voltage such as supply voltage Vin for powering inverter 60. Device 12 may further include one or more voltage sensors such as voltage sensor 18A and one or more current sensors such as current sensor 18B. Voltage sensor 18A and current sensor 18B, although shown as being separate from measurement circuitry 41, can sometimes be considered part of measurement circuitry 41. Voltage sensor 18A may be configured to measure a voltage level for the inverter supply voltage Vin, whereas current sensor 18B may be configured to measure a current level for an inverter current Iin flowing through inverter 60.

If desired, power receiving device 24 can also include one or more voltage sensors such as voltage sensor and one or more current sensors such as current sensor 19B. Voltage sensor 19A and current sensor 19B, although shown as being separate from measurement circuitry 43, can sometimes be considered part of measurement circuitry 43. Voltage sensor 19A may be configured to measure a voltage level of voltage Vrect output from rectifier 50, whereas current sensor 19B may be configured to measure a current level of an output current flowing into load 78. The voltage and current sensors within system 8 may be used to determine power levels within the system. The specific locations of sensors 18A, 18B, 19A, and 19B (on the DC sides of inverter 60 and rectifier 50 respectively) in FIG. 2 are merely illustrative. In general, voltage and current sensors may be positioned at any desired positions within the power transmitting circuitry 52 and the power receiving circuitry 54 (e.g., on the AC sides of inverter 52 and rectifier 50, if desired.

As described above, the power transmitting device (PTX) 12 and the power receiving device (PRX) 24 can exchange in-band communications during wireless power transfer operations. During the in-band communications, one or more packets can be conveyed between devices 12 and 24. There can be time periods during such in-band communications where no packets are exchanged between devices 12 and 24. Such a time period or window of time during in-band communications when no packets is exchanged or expected to be exchanged between devices 12 and 24 can be referred to herein as a silent period, a communications silence period, or a silence window. Wireless power transfer can still occur during a silent period. Indeed, the communications silence period can sometimes be used to provide the data receiver an opportunity to react to the data packet that has been received. For example, a data sender may instruct a data receiver (which may part of power transmitting device 12) to change its output power. The sender and receiver may understand, in accordance with a priori negotiation and/or adherence to a protocol specification, that after the particular instruction, a silence period applies such that the data receiver (within power transmitting device 12) can adjust the characteristics of the wireless signal, without risk of affecting in-band communications attempts on the signal.

In accordance with an embodiment, power transmitting device 12 can be configured to selectively deactivate one or more hardware components, particularly those that facilitate data communications, during a silent period to conserve power. Since silent periods can occur often, sometimes periodically, during wireless power transfer operations. Thus, deactivating one or more hardware components during these occurrences can be technically advantageous and beneficial to dramatically reduce power consumption, which can result in a lower heat dissipation and higher power delivery and efficiency when charging power receiving device 24.

Figure 3:
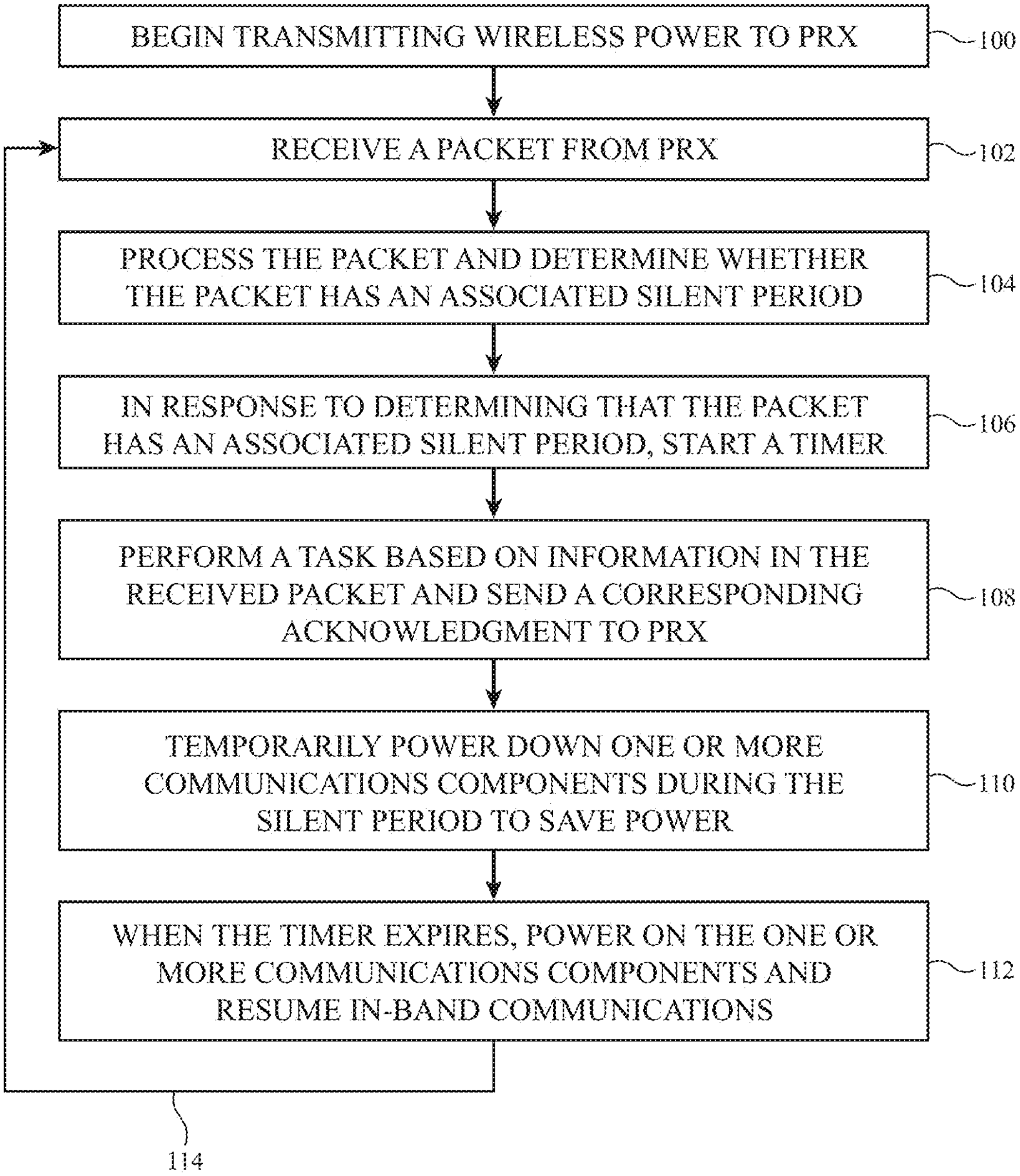
FIG. 3 is a flowchart of illustrative steps for operating a power transmitting device during wireless power transfer operations in accordance with some embodiments.

FIG. 3 is a flowchart of illustrative steps for operating a power transmitting device during wireless power transfer operations in accordance with some embodiments. During the operations of block 100, power transmitting device 12 can begin transmitting wireless power to power receiving device (PRX) 24. Such an operating mode of power transmitting device 12 during which device 12 transmits wireless power signals to power receiving device 24 is sometimes referred to as an active wireless power transfer mode. During the active wireless power transfer mode, the power receiving circuitry 54 of device 24 can convert the wireless power signals into corresponding output voltage Vrect, which can be used to charge a battery within device 24 (see, e.g., Vrect at the output of rectifier 50 in FIG. 2 and battery 58 in FIG. 1).

During the operations of block 102, power transmitting device 12 can receive a packet from power receiving device 24 via in-band communications. In general, packets can be conveyed periodically or aperiodically between devices 12 and 24. For example, power transmitting device 12 can receive a control error packet (CEP) or an extended control error (XCE) packet from power receiving device 24 in accordance with the Qi standard as specified by the Wireless Power Consortium organization. Control error packets and extended control error packets are packets including information for controlling the amount of power being transferred from power transmitting device 12 to power receiving device 24 and are thus sometimes referred to more generically as power feedback requests (or packets), power control requests (or packets), or power adjustment requests (or packets) that include power feedback information, power control information, or power adjustment information. Power receiving device 24 can send CEP or XCE packets to power transmitting device 12 at regular intervals during the active wireless power transfer mode. The packet(s) can be received by data receiver 40R (see FIG. 2) by sampling signals at node 71. For example, a high-speed analog-to-digital converter (ADC) 90 can be configured to sample the in-band ASK modulated data at node 71. The high-speed ADC 90 can be considered to be part of ASK demodulator 40R as shown in FIG. 2 or can alternatively be considered a separate front-end component at the input of ASK demodulator 40R.

This example in which power transmitting device 12 receives a power adjustment request/packet from power receiving device 24 during block 104 is illustrative. During block 104, power transmitting device 12 can additional or alternatively obtain, from power receiving device 24, a packet including information indicating an amount of power received at device 24, a packet indicating a charge or battery level at device 24, an authentication packet, and/or other types of data packets via in-band communications.

During the operations of block 104, power transmitting device 12 can process the received packet and determine whether the received packet has an associated silent period. For example, data receiver 40R can decode the received packet and convey the decoded packet to be processed at control circuitry 16 (see FIG. 2). In the example of FIG. 2, a firmware 94 or other processing subsystem within control circuitry 16 can be configured to process the received packet and to determine whether the packet has an associated silent period (e.g., by examining or evaluating information in a header of the packet). The packet header can include information indicating the type of packet and whether that packet has an associated silent period. Some packets such as CEP or XCE power adjustment packets have guaranteed ensuing silent periods. For instance, in response to receiving a CEP or XCE packet, the power transmitting device 12 can expect a silent period having a duration in the milliseconds range, for example 5 to 600 milliseconds (ms). Device 12 can expect device 24 to not send any packets during the silent period immediately following transmission of the CEP or XCE packet. During the silent period, power transmitting device 12 can ramp up or ramp down its wireless power transfer level based on the power adjustment request. Such adjustment of wireless power level can be achieved by adjusting a phase and/or duty cycle of the AC signals output from inverter 60 (see FIG. 2) and supplied to wireless power transfer coil 42. The example described here in which a CEP/XCE power adjustment packet has an associated silent period is illustrative. In general, other types of packets can also have associated silent periods of various durations.

In response to determining that the packet has an associated silent period, power transmitting device 12 can start or activate a timer (see operations of block 106). Such timer, sometimes referred to as a silent period timer, can be managed by firmware 94 or other timing component within control circuitry 16. The timer can have a configurable duration that is equal to the duration of the silent period. Different packets can have different silent period durations and thus different timer durations. The duration of a silent period can optionally be negotiated or selected by the power receiving device 24, which is described in more detail in connection with FIGS. 5-7. The silent period may optionally be synchronized with the silent period timer (e.g., the timer can expire at the end of the communications silence period).

During the operations of block 108, power transmitting device 12 may be configured to perform a task based on information in the received packet and to optionally send a corresponding acknowledgement to power receiving device 24. For example, in response to receiving a CEP or XCE packet, firmware 94 or other control component running on circuitry 16 can be configured to dynamically adjust a non-zero inverter supply voltage Vin. A power adjustment packet requesting a higher wireless transfer power will result in increasing inverter supply voltage Vin, whereas a power adjustment packet requesting a lower wireless transfer power will result in decreasing inverter supply voltage Vin. The adjustment of inverter supply voltage Vin may involve data conversion at an analog-to-digital converter (ADC) 92 within control circuitry 16. Data converter 92 may be comparatively lower speed than the sampling ADC 90.

After, before, or in parallel with adjusting voltage Vin, power transmitting device 12 can transmit an acknowledgement (ACK) packet, via in-band communications, back to power receiving device 24 for acknowledging execution of the requested task. During block 108, if firmware 94 running on device 12 determines for any reason that it is not feasible to adjust Vin, firmware 94 can direct device 12 to send a negative acknowledgement (NACK) packet, via in-band communications, back to device 24 to notify device 24 that the requested task will not be done. In general, other types of packets can result in power transmitting device 12 performing other types of tasks and may or may not require sending an acknowledgement.

During the operations of block 110, power transmitting device 12 may temporarily power down (turn off or deactivate) one or more communications components during the silent period to conserve power. As an example, power transmitting device 12 can selectively deactivate data receiver (e.g., ASK decoder) 40R and/or optionally high-speed ADC 90 at the input of receiver 40R. In some embodiments, device 12 can selectively deactivate one or more components that are part of or associated with ASK decoder 40R (e.g., device 12 might turn off part of the ASK decoder or can turn off the ASK decoder entirely). When only a portion of the ASK decoder 40R is deactivated, another portion of the ASK decoder 40R can still be powered on. If desired, power transmitting device 12 can optionally deactivate firmware 94, ADC 92, and/or other components that might be used for in-band communications. If desired, power transmitting device 12 can also selectively deactivate its data transmitter (e.g., FSK encoder) 40T after transmitting the acknowledgement packet to device 24. In other words, power transmitting device 12 can partially or completely turn off transceiver 40 during at least a portion of the silent period.

The operations of block 110 for deactivating one or more hardware and/or software components within power transmitting device 12 are exemplary. If desired, power receiving device 24 may optionally power down (turn off or deactivate) one or more hardware and/or software components, including communications components, during at least a portion of the silent period to conserve power on device 24. For example, device 24 can selectively deactivate its data receiver (e.g., FSK decoder) 46R after receiving the acknowledgement packet from device 12. If desired, power receiving device 24 can also selectively deactivate its data transmitter (e.g., ASK encoder) 46T during the silent period. In other words, power receiving device 24 can partially or completely turn off transceiver 46.

The example of FIG. 3 in which the operations of block 110 are shown as occurring after the operations of block 108 is illustrative. If desired, the operations of block 110 can occur in parallel (simultaneously) with the operations of block 108. For example, power transmitting device 12 can selectively power down the data receiver 40R and/or ADC 90 in parallel with adjusting the inverter supply voltage Vin or in parallel with sending the acknowledgement packet back to the power receiving device 24. In other embodiments, the operations of block 110 can optionally occur before the operations of block 108.

In response to an expiration of the silent period timer, power transmitting device 12 can power on (re-activate or turn back on) the one or more communications components that it previously deactivated during block 110 to resume in-band communications (see operations of block 112). If the power receiving device 12 previously deactivated any components during block 110, device 12 can also turn those components back on during block 112. Processing may loop back to block 102 when power transmitting device 12 receives another packet from power receiving device 24, as indicated by arrow 114. Opportunistically deactivating one or more in-band communications components in device 12 and/or device 24 during silent periods in this way can be technically advantageous and beneficial to save power, which can result in reduced heat dissipation and improved wireless power delivery and charging efficiency.

Figure 4:
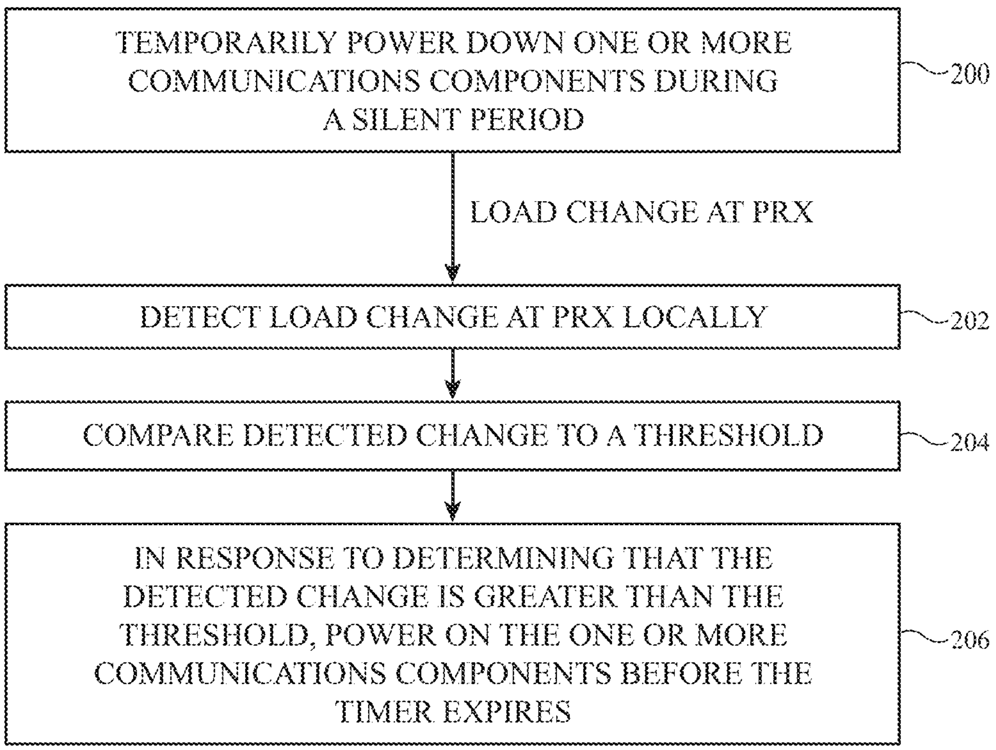
FIG. 4 is a flowchart of illustrative steps for waking up the power transmitting device in response to detecting a change in power draw at the power receiving device in accordance with some embodiments.

The example of FIG. 3 in which power transmitting device 12 is configured to deactivate one or more in-band communications components during the entirety of the silent period is illustrative. FIG. 4 is a flowchart of illustrative steps show how power transmitting device 12 can wake up early before the end of silent period. During the operations of block 200, power transmitting device 12 can temporarily deactivate one or more communications components during the silent period to conserve power. Block 200 of FIG. 4 may be equivalent to block 110 of FIG. 3 and the steps of blocks 100-108 leading up to this point need not be reiterated here to avoid obscuring the present embodiment.

During the silent period, although the power receiving device 24 should not be sending any packets to the power transmitting device 12, power consumed at the power receiving device 24 can change based on an action from a user of device 24. Power consumption may refer to an amount of power, which is related to the amount of voltage and current sensed by sensors 19A and 19B in FIG. 2, drawn by load 78 or to an amount of power drawn from the battery of device 24. As an example, the power draw at device 24 can increase dramatically if the user starts an application during the silent period. Conversely, the power consumption might decrease dramatically if the user closes an application during the silent period. In either scenario, it may be beneficial for power transmitting device 12 to wake up to confirm that the current wireless power transfer is appropriate for the current operating condition of power receiving device 24. Such change in power draw by power receiving device 24 can be due to a change in power drawn by load 78 and is thus sometimes referred to as a "load change" at device 24.

During the operations of block 202, power transmitting device 12 can detect such change in power draw or load change at the power receiving receive 24 by, for example, monitoring a corresponding change in voltage at voltage sensor 18A or a change in current at current sensor 18B. A load change at power receiving device 24 can cause the inverter supply current Iin, a current flowing through coil 42, and/or other current flowing through power transmitting circuitry 52 to change accordingly. In general, power transmitting device 12 can detect such load change at the power receiving device 24 by monitoring one or more signal levels not limited to current, voltage, and/or power using measurement circuitry 41 within device 12.

During the operations of block 204, power transmitting device 12 can compare the detected change observed during block 202 to a threshold. As an example, power transmitting device 12 can compare an amount of current change to a current threshold. As another example, power transmitting device 12 can compare an amount of voltage change to a voltage threshold. As another example, power transmitting device 12 can compare an amount of power change to a power threshold. If desired, other types of operating parameters can be measured and compared during block 204.

In response to determining that the detected load change is greater than the threshold, power transmitting device 12 can proceed to activate the one or more communications components that it had previously deactivated during block 200 before the silent period timer expires (see operations of block 206). The mode of device 12 and/or device 24 during which one or more in-band communications components are selectively powered down during a silent period is sometimes referred to and defined herein as a "communications sleep mode." Exiting the communications sleep mode before the end of the silent period via the steps of FIG. 4 can be technically advantageous and beneficial to allow power transmitting device 12 to wake up early and start listening for potential packets that might arrive from power receiving device 24 due to an unexpected change in the power draw or load change at device 24. As examples, power receiving device 24 might send a power renegotiation packet to device 12 (e.g., to renegotiate a new wireless transmit power level due to a sudden load change), a packet directing the devices to swap roles (e.g., a packet indicating that device 24 will be changing from receiving wireless power to instead transmit wireless power to device 12), a packet to halt the active wireless power transfer, or a packet directing device 12 to power off. In other words, the active wireless power transfer mode can optionally be halted (to switch to a wireless power transfer halted mode) before the end of the silent period.

The example of FIG. 4 in which power transmitting device 12 exits the communications sleep mode early is illustrative. In some embodiments, power transmitting device 12 can, in response to exiting its own communications sleep mode, also proceed to wake up or send one or more packets to power receiving device 24 before the end of the silent period. For example, after waking up from the communications sleep mode, power transmitting device 12 can employ data transmitter (e.g., FSK encoder) 40T to send one or more FSK data packets to power receiving device 24 to notify device 24 that it has already waken up and is ready to start receiving new packets.

Figure 5:
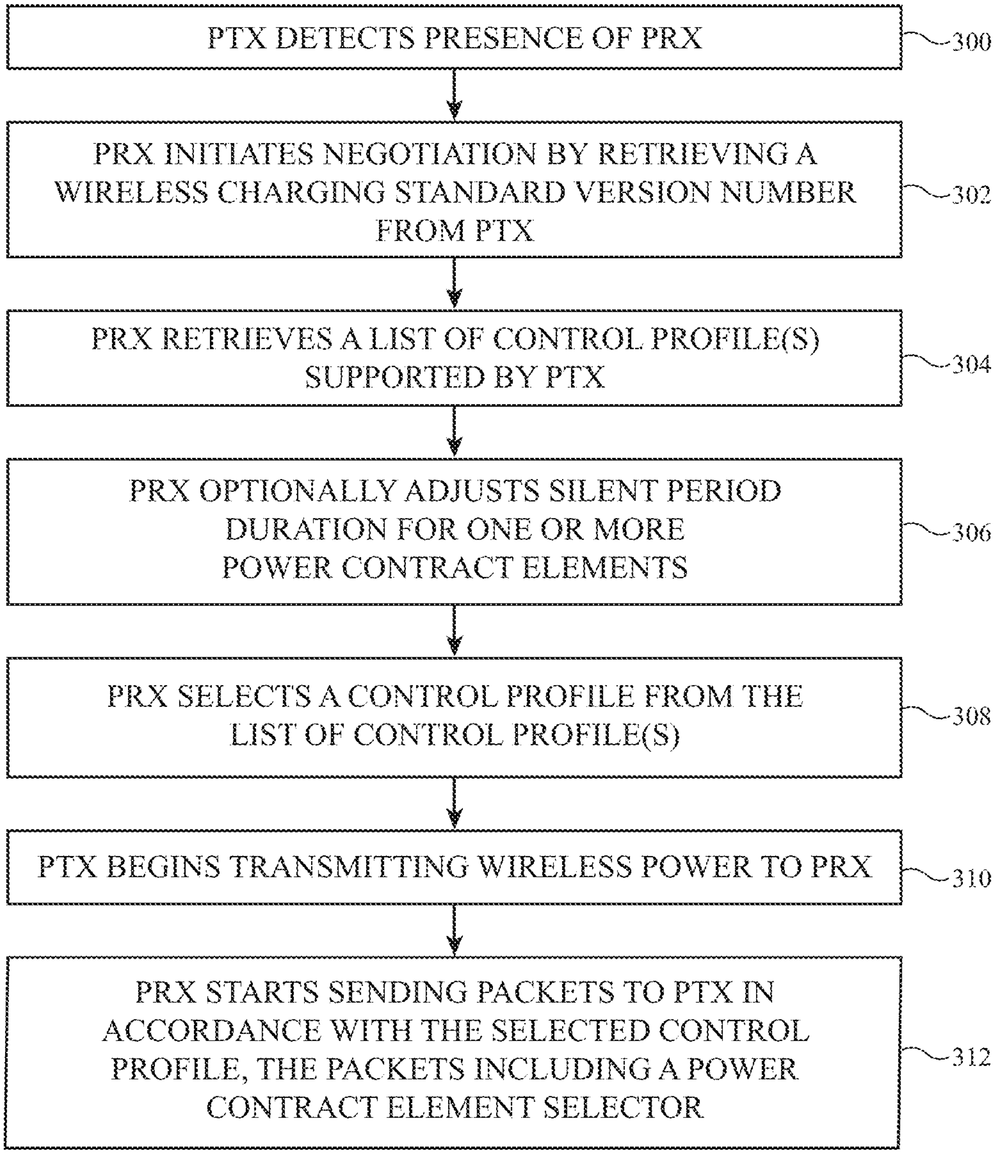
FIG. 5 is a flowchart of illustrative steps for negotiating a silent period duration in accordance with some embodiments.

In accordance with some embodiments not mutually exclusive with the embodiments of FIGS. 1-4, power receiving device 24 can be configured to negotiate or set the duration for the silent period that is employed during the communications sleep mode. FIG. 5 is a flowchart of illustrative steps for negotiating a silent period duration. During the operations of block 300, power transmitting device 12 can operate in a foreign object detection (FOD) mode and can detect the presence of a power receiving device 24 on its charging surface. As an example, power transmitting device 12 may use low-power external object detection or analog pings to detect the presence of a foreign object. As another example, power transmitting device 12 may employ measurement circuitry 41 (FIG. 2) to perform impedance measurements, impulse response measurements, or other suitable foreign object detection schemes to detect when device 24 has been placed on the charging surface of device 12.

After detecting the presence of power receiving device 24 on its charging surface, power transmitting device 12 can initiate negotiations by retrieving a wireless charging standard version number from power transmitting device 12, as shown in the operations of block 302. In general, each wireless charging standard (protocol) can have versions or revisions as the standard is updated over time. As examples, the Qi specification includes various versions that define power profiles having different maximum power transfer capabilities, communications protocols, object detection capabilities, and other aspects of wireless power transfer operations.

During the operations of block 304, power receiving device 24 can retrieve from power transmitting device 12 information that identifies one or more control profiles being supported by device 12. In general, power transmitting device 12 might support one or more control profile(s). Device 12 can support a first (baseline) control profile that provides a default power contract element, which specifies a default duration for the silent period. Each power contract element may have a corresponding silent period duration value. The default silent period duration specified by the default power contract element may be 20 ms, 30 ms, 20-30 ms, less than 20 ms, less than 30 ms, less than 40 ms, less than 50 ms, or other suitable default value.

Device 12 can optionally support a second (configurable) control profile that provides one or more configurable power contract elements. For example, the second control profile may include a first configurable power contract element that specifies a first configurable duration for the silent period, a second configurable power contract element that specifies a second configurable duration for the silent period, a third configurable power contract element that specifies a third configurable duration for the silent period, a fourth configurable power contract element that specifies a fourth configurable duration for the silent period, etc. As examples, the first configurable silent period duration associated with the first power contract element may be 50 ms or other configurable value that can be adjusted by device 24; the second configurable silent period duration associated with the second power contract element may be 100 ms or other configurable value that can be adjusted by device 24; the third configurable silent period duration associated with the third power contract element may be 200 ms or other configurable value that can be adjusted by device 24; the fourth configurable silent period duration associated with the fourth power contract element may be 500 ms or other configurable value that can be adjusted by device 24; and so on. If desired, power transmitting device 12 can support additional power profiles with fixed or configurable (adjustable) power contract elements. Such type of control profiles supported by power transmitting device 12 are sometimes referred to as power control profiles.

During the operations of block 306, power receiving device 24 can optionally adjust the silent period duration for one or more power contract elements. For example, device 24 might adjust the second power contract element so that the second configurable silent period duration is changed from 100 ms to 125 ms, to 80 ms, or to other suitable value. If desired, device 24 can adjust the duration of multiple power contract elements.

During the operations of block 308, power receiving device 24 can select a control profile amongst the control profiles that are identified during block 304. If the power transmitting device 12 only supports the baseline control profile (e.g., if the list includes only the baseline control profile), then power receiving device 24 will only be able to select the baseline control profile. If the power transmitting device 12 supports multiple control profiles (e.g., if the identified profiles include the baseline control profile, the configurable control profile, and optionally other control profiles), then power receiving device 24 can select from among the many control profiles. During the operations of block 310, power transmitting device 12 can begin transmitting wireless power to power receiving device 24 in accordance with the wireless charging standard version number obtained during block 302.

Figures 6, 7:
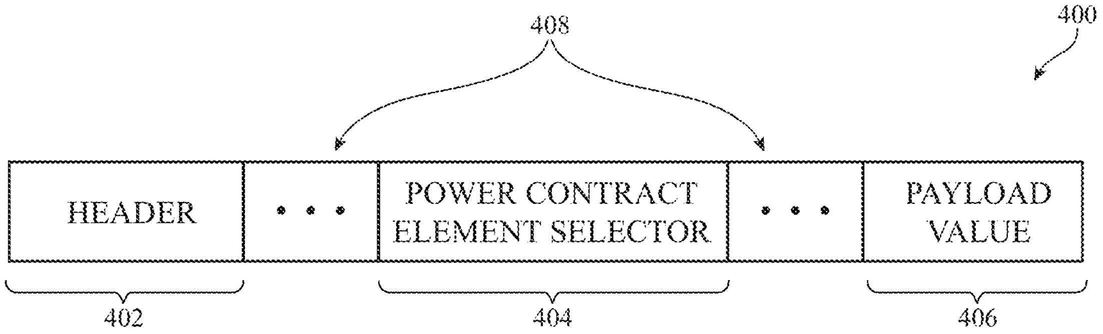
FIG. 6 is a diagram of an illustrative packet that can be conveyed between the power receiving device and the power transmitting device in accordance with some embodiments.
FIG. 7 is a diagram showing how different selector values in the packet shown in FIG. 6 can correspond to different configurable silent period durations in accordance with some embodiments.

During the operations of block 312, power receiving device 24 can start sending packets to power transmitting device 12 in accordance with the control profile selected from block 308. FIG. 6 is a diagram of an illustrative packet such as packet 400 that can be conveyed between devices 12 and 24. As shown in FIG. 6, packet 400 can include a header such as header 402, a selector such as a power contract element selector 404, a payload having a payload value 406, and optionally other information 408. Although power contract element selector 404 is shown as a separate field from header 402, power contract element selector 404 can sometimes be part of header 402. Packet 400 having a power contract element selector 404 may be a CEP or XCE packet or other types of power adjustment packets. The payload value 406 of a CEP or XCE packet may be a control error value indicating an amount by which the power transmitting device 12 should increase or decrease its wireless power level to meet the current demands of device 24. The payload value 406 of packet 400 can additionally or alternatively include a value for specifying a duration of the silent period associated with packet 400 or a value that is used to compute the duration of the silent period associated with packet 400 (e.g., the silent period duration can be computed based on a value in the packet payload). Other types of packets can also include a selector for specifying a power contract element or other element that can be used to assign or compute a silent period duration.

The power contract element selector 404 of packet 400 may be a single-bit or multi-bit field for specifying a power contract element. As described above in connection with blocks 304 and 306 in FIG. 5, different power contract elements can be associated with different silent period durations. FIG. 7 shows a table 500 illustrating how different power contract element selector values in packet 400 can correspond to different configurable silent period durations. As shown in FIG. 7, a first power contract element selector value of "0" can correspond to a first configurable silent period duration T1; a second power contract element selector value of "1" can correspond to a second configurable silent period duration T2 different than T1; a third power contract element selector value of "2" can correspond to a third configurable silent period duration T3 different than T1 and T2; a fourth power contract element selector value of "3" can correspond to a fourth configurable silent period duration T4 different than T1-T3; and so on. Thus, when power transmitting device 12 receives a packet 400 that includes a power contract element selector value of "1," then device 12 will subsequently enter a communications sleep mode with a corresponding silent duration T2. The operations of block 310 and 312 in FIG. 5 can correspond to the operations of block 100 and 102 in FIG. 3. Thus, the operations of blocks 104-112 described in connection with FIG. 3 can follow block 312 and need not be reiterated to avoid obscuring the present embodiment.

The operations of FIGS. 3-5 are illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The foregoing is merely illustrative and various modifications can be made to the described embodiments. The foregoing embodiments may be implemented individually or in any combination.

What is claimed is:

1. A method of operating an electronic device, comprising:

with a wireless power transfer coil, transmitting wireless power to a power receiving device;

with a data receiver coupled to the wireless power transfer coil, obtaining a packet transmitted from the power receiving device;

determining whether the packet has an associated silent period; and in response to determining that the packet has an associated silent period, deactivating one or more communications components of the electronic device during at least a portion the silent period.

2. The method of claim 1, wherein determining whether the packet has an associated silent period comprises evaluating a header of the packet.

3. The method of claim 1, wherein obtaining the packet transmitted from the power receiving device comprises decoding the packet in accordance with a protocol specification utilized by the electronic device and the power receiving device, and wherein determining whether the packet has an associated silent period comprises identifying a type of the packet and determining whether the protocol specification defines a silent period for the identified type of packet.

4. The method of claim 3, wherein identifying a type of the packet comprises identifying whether the packet comprises a control error packet or an extended control error packet configured to request an adjustment to the wireless power transmitted by the wireless power transfer coil.

5. The method of claim 1, wherein deactivating the one or more communications components comprises deactivating one or more components of the data receiver.

6. The method of claim 1, wherein the data receiver comprises an amplitude-shift keying (ASK) decoder, and wherein deactivating the one or more communications components comprises deactivating at least a portion of the ASK decoder.

7. The method of claim 1, wherein the electronic device further comprises an inverter configured to output alternating-current (AC) signals to the wireless power transfer coil, the method further comprising:

adjusting a supply voltage of the inverter during the silent period; and adjusting a phase or a duty cycle of the AC signals output from the inverter during the silent period.

8. The method of claim 1, further comprising:

with a data transmitter coupled to the wireless power transfer coil, sending an acknowledgement packet to the power receiving device after determining whether the packet has an associated silent period and before or in parallel with deactivating the one or more communications components of the electronic device during the silent period.

9. The method of claim 8, further comprising:

after sending the acknowledgement packet to the power receiving device, deactivating the data transmitter during at least a portion the silent period.

10. The method of claim 8, further comprising:

with the data transmitter, sending a packet to the power receiving device before an expiration of the silent period, wherein the packet notifies the power receiving device that the electronic device is ready to receive new packets.

11. The method of claim 1, further comprising: after deactivating the one or more communications components of the electronic device in response to determining that the packet has an associated silent period, re-activating the one or more deactivated communications components by or before an expiration of the silent period.

12. The method of claim 1, wherein the electronic device further comprises an inverter configured to output alternating-current (AC) signals to the wireless power transfer coil, the method further comprising:

in response to detecting, using the wireless power transfer coil, a change in load characteristics of the power receiving device, re-activating the one or more deactivated communications components before an expiration of the silent period.

13. The method of claim 1, further comprising: identifying, from a portion of the packet, a value representing a duration of the silent period, wherein deactivating the one or more communications components of the electronic device comprises deactivating the one or more communications components of the electronic device in accordance with the duration specified by the value.

14. A power transmitting device comprising:

a wireless power transfer coil;

an inverter configured to supply alternating-current signals to the wireless power transfer coil for transmitting wireless power to a power receiving device;

a data receiver coupled to the wireless power transfer coil and configured to obtain a packet, transmitted from the power receiving device, having an associated communications silence period; and control circuitry configured to deactivate the data receiver during at least a portion of the communications silence period.

15. The power transmitting device of claim 14, further comprising:

a data transmitter coupled to the wireless power transfer coil, wherein the control circuitry is further configured to deactivate the data transmitter during at least a portion of the communications silence period.

16. A non-transitory computer-readable storage medium storing one or more programs configured to be executed by one or more processors of a power transmitting device configured to transmit wireless power to a power receiving device, the power transmitting device comprising a wireless power transfer coil and a data receiver coupled to the wireless power transfer coil, and the one or more programs comprising instructions for:

processing a packet at the data receiver;

determining whether the packet has an associated silent period; and in response to determining that the packet has an associated silent period, deactivating the data receiver during at least a portion of the silent period.

17. The non-transitory computer-readable storage medium of claim 16, the one or more programs further comprising instructions for:

deactivating a data transmitter that is coupled to the wireless power transfer coil during at least a portion of the silent period.

18. Control circuitry coupled to a wireless power transfer coil of a power transmitting device, the control circuitry being configured to:

initiate communications with a power receiving device during which the wireless power transfer coil transmits wireless power to a power receiving device;

process a packet received from the power receiving device during the communications;

determine whether the packet has an associated silent period; and deactivate one or more communications component of the power transmitting device during at least a portion of the silent period in response to determining that the packet has an associated silent period.

19. The control circuitry of claim 18, wherein the one or more communications component being deactivated comprise a data receiver or a data transmitter coupled to the wireless power transfer coil.

20. The method of claim 1, wherein deactivating the one or more communications components of the electronic device during at least the portion the silent period comprises turning off the one or more communications components of the electronic device during at least the portion the silent period.

* * * * *